US010064330B2

(12) United States Patent
Thorsell (10) Patent No.: US 10,064,330 B2
(45) Date of Patent: Sep. 4, 2018

(54) SLIDING SHIELD FOR ROTARY CUTTER (71) Applicant: Great Plains Manufacturing, Inc., Salina, KS (US)

(72) Inventor: Erik Thorsell, Salina, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 127 days.

(21) Appl. No.: 15/144,266

(22) Filed: May 2, 2016

(65) Prior Publication Data

US 2016/0324068 A1 Nov. 10, 2016

Related U.S. Application Data (60) Provisional application No. 62/157,301, filed on May 5, 2015.

(51) Int. Cl.
*A01D 34/82* (2006.01)
*A01D 34/76* (2006.01)

(52) U.S. Cl.
CPC .......... *A01D 34/828* (2013.01); *A01D 34/76* (2013.01)

(58) Field of Classification Search
CPC ...... A01D 34/64; A01D 34/685; A01D 34/66; A01D 34/76; A01D 34/81; A01D 34/828; A01D 75/18; A01D 75/30; A01D 75/303; A01D 75/306
See application file for complete search history.

(56) References Cited

U.S. PATENT DOCUMENTS

| | | | | |
|---|---|---|---|---|
| 3,121,302 A * | 2/1964 | Kulak | ..................... | A01D 75/20 56/13.6 |
| 4,258,535 A * | 3/1981 | Jones | ..................... | A01D 34/66 56/119 |
| 5,450,714 A * | 9/1995 | Lurwig | .................. | A01D 34/66 56/13.5 |
| 5,626,007 A * | 5/1997 | Harrington | ............ | A01D 34/66 56/13.5 |
| 5,957,796 A * | 9/1999 | McLean | .................. | F04B 23/00 417/313 |
| 7,735,305 B1 * | 6/2010 | Cozine | ................... | A01D 34/81 56/17.4 |
| 7,784,255 B2 * | 8/2010 | Moore, Jr. | ........... | A01D 75/306 56/320.1 |
| 2003/0005672 A1 * | 1/2003 | Friesen | ................ | A01D 67/005 56/6 |
| 2004/0221558 A1 * | 11/2004 | Stevenson | .............. | A01D 34/86 56/6 |

(Continued)

*Primary Examiner* — Robert E Pezzuto
*Assistant Examiner* — Adam J Behrens
(74) *Attorney, Agent, or Firm* — Hovey Williams LLP (57) ABSTRACT A shield assembly for agricultural equipment. The agricultural equipment can include rotary-power distribution components for distributing rotary power through the agricultural equipment. The shield assembly comprises a sliding shield configured to be selectively positioned in a closed position and an open position. In the closed position the sliding shield is configured to cover at least a portion of the rotary-power distribution components of the agricultural equipment. In the open position the sliding shield is configured to provide access to at least a portion of the rotary-power distribution components of the agricultural equipment. The sliding shield is configured to shift from the closed position to the open position via substantially linear actuation.

7 Claims, 11 Drawing Sheets (56) References Cited

U.S. PATENT DOCUMENTS

| | | | |
|---|---|---|---|
| 2016/0037718 A1* | 2/2016 | Reid, Sr. | A01D 34/66 56/17.4 |
| 2016/0135354 A1* | 5/2016 | Thorsell | A01B 63/16 56/255 |

* cited by examiner

SLIDING SHIELD FOR ROTARY CUTTER

CROSS-REFERENCE TO RELATED APPLICATION

This non-provisional patent application claims priority to U.S. Provisional Patent Application Ser. No. 62/157,301, filed on May 5, 2015, entitled "SLIDING SHIELD FOR ROTARY CUTTER," the entirety of which is incorporated by reference into the present non-provisional patent application.

BACKGROUND OF THE INVENTION

1. Field of the Invention

Embodiments of the present invention relate generally to a shield for agricultural equipment, such as a rotary cutter. More specifically, embodiments of the present invention are directed to a shield configured to slidingly actuate so as to cover components of a rotary cutter when in a closed position and to provide access to such components when in an open position.

2. Description of the Related Art

Rotary cutters are pieces of agricultural equipment that can be used to cut brush, grass, saplings, or other vegetation. In general, rotary cutters are configured to be pulled behind a tractor. As such, the tractor can propel the rotary cutter as well as provide power to the rotary cutter's cutting blades, which are generally secured underneath the rotary cutter's deck.

In more detail, power can be provided from the tractor to the rotary cutter in the form of a main driveline that extends from a power take-off of the tractor to the rotary cutter. The rotary power from the main driveline can be provided to various rotary-power distribution components (e.g., drivelines, splitterboxes, gearboxes, clutches, U-joints, etc.) of the rotary cutter for purposes of distributing the power to cutting blades located on the bottom of the rotary cutter. For safety purposes, portions of the rotary-power distribution components are often required to be covered during operation of the rotary cutter. In the past, such covering was generally performed by a shield element, such as a metal housing. The shield element would generally need to be at least partially removable so as to provide access to the underlying rotary-power distribution components of the rotary cutter, such as may be necessary for maintenance and repair.

To accomplish the removal of such previously-used shield elements, previously-used rotary cutters included shields that were hingedly connected to the rotary cutter. As such, the previously-used shield elements were configured to rotate (i.e., swing) open to provide access to the underlying rotary-power distribution components of the rotary cutter. Such previously-used shield elements were, however, problematic in that they did not provide access to the rotary-power distribution components of the rotary cutter from all sides of the rotary cutter. Instead, the shield element would block access to the components from the side on which the shield element was swung and/or propped open. Furthermore, previously-used shield elements were known to inadvertently close, such as under the force of a strong wind gust. Inadvertent closing of a shield element could interfere with a user's maintenance or repair of the rotary cutter. Such inadvertent closing could also pose a risk of injury to the user of the rotary cutter. Furthermore, such hingedly-connected shield elements were prone to vibration and rattling, which caused excessive noise and increased the shield elements' mechanical failure rates.

Accordingly there exists a need for a rotary cutter shield that covers components of the rotary cutter when in a closed position, and that provides access from all sides of the rotary cutter to the components when in an open position. Furthermore, there exists a need for a shield that will not inadvertently close from an open position and that is secured in the closed position in a manner that does not rattle, vibrate or make excessive noise.

SUMMARY

Embodiments of the present invention include a shield assembly for agricultural equipment. The agricultural equipment can include rotary-power distribution components for distributing rotary power through the agricultural equipment. The shield assembly comprises a sliding shield configured to be selectively positioned in a closed position and an open position. In the closed position the sliding shield is configured to cover at least a portion of the rotary-power distribution components of the agricultural equipment. In the open position the sliding shield is configured to provide access to at least a portion of the rotary-power distribution components of the agricultural equipment. The sliding shield is configured to shift from the closed position to the open position via substantially linear actuation.

Embodiments of the present invention additionally include a rotary cutter comprising a splitterbox configured to receive power from a main driveline and to distribute the power to one or more gearboxes. The rotary cutter additionally comprises a center gearbox configured to actuate a center cutter blade, with the center gearbox being connected to the splitterbox via an intermediate driveline. The rotary cutter additionally comprises first and second wing gearboxes configured to actuate first and second wing cutter blades, respectively, with the first and second wing gearboxes being connected to the splitterbox via first and second wing drivelines, respectively. The rotary cutter further includes a shield configured to be selectively positioned in a closed position and an open position. In the closed position the shield is configured to cover at least a portion of the splitterbox, the intermediate driveline, and the first and second wing drivelines. The shield is configured to shift from the closed position to the open position via substantially linear actuation.

Embodiments of the present invention further include a method for accessing rotary-power distribution components of a rotary cutter, with the rotary-power distribution components including a splitterbox, one or more gearboxes, and one or more drivelines connecting the gearboxes with the splitterbox. The method comprises the initial step of unsecuring a sliding shield from a closed position. In the closed position the sliding shield is configured to cover at least a portion of the splitterbox and at least a portion of the secondary drivelines. An additional step includes shifting the sliding shield from the closed position to an open position. In the open position the sliding shield is configured to provide access to the splitterbox and to the secondary drivelines. The shifting step comprises shifting the sliding shield from the closed position to the open position via generally linear actuation.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
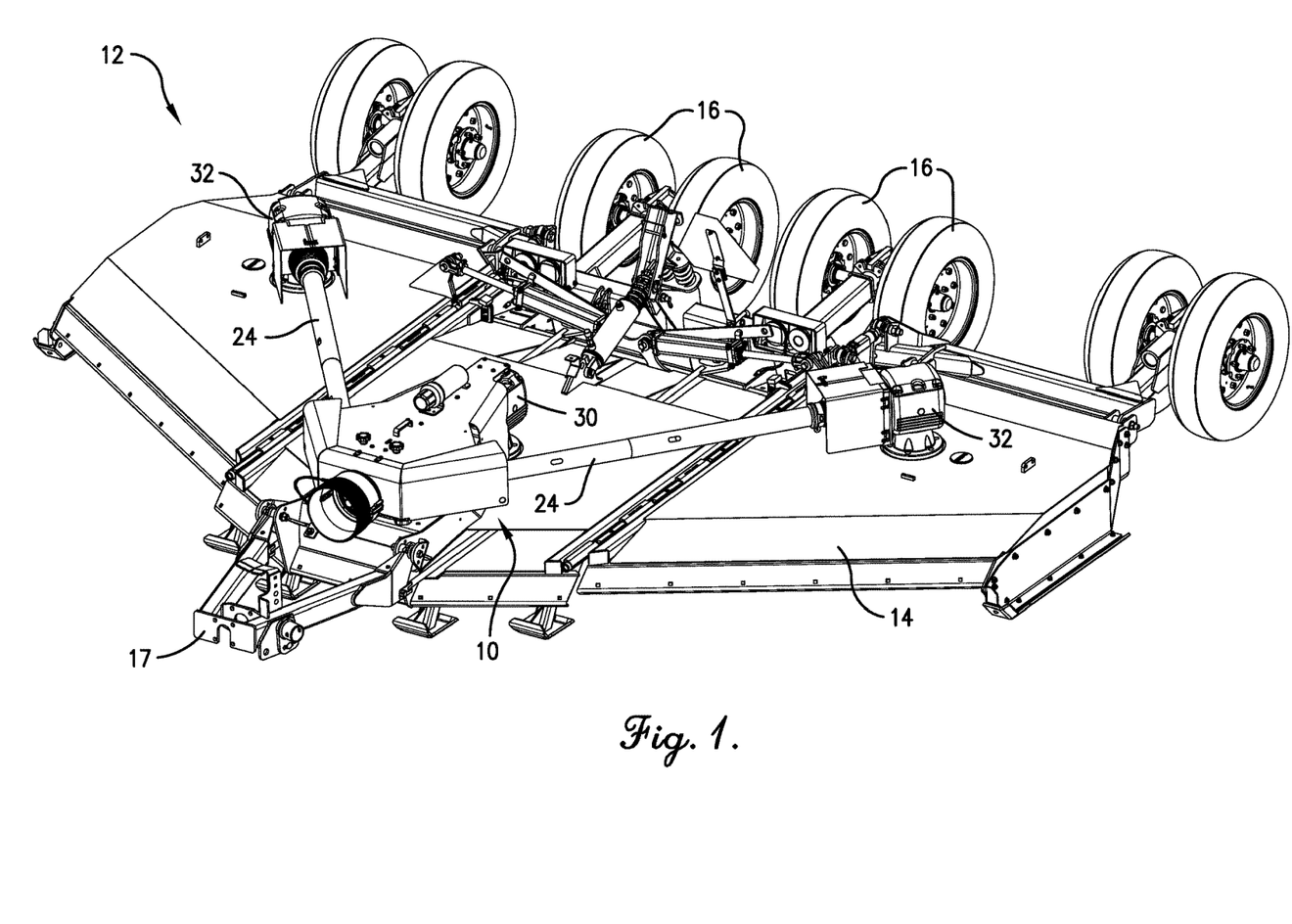
FIG. 1 is front top perspective view of a rotary cutter with a sliding shield assembly according to embodiments of the present invention.
Figure 2:
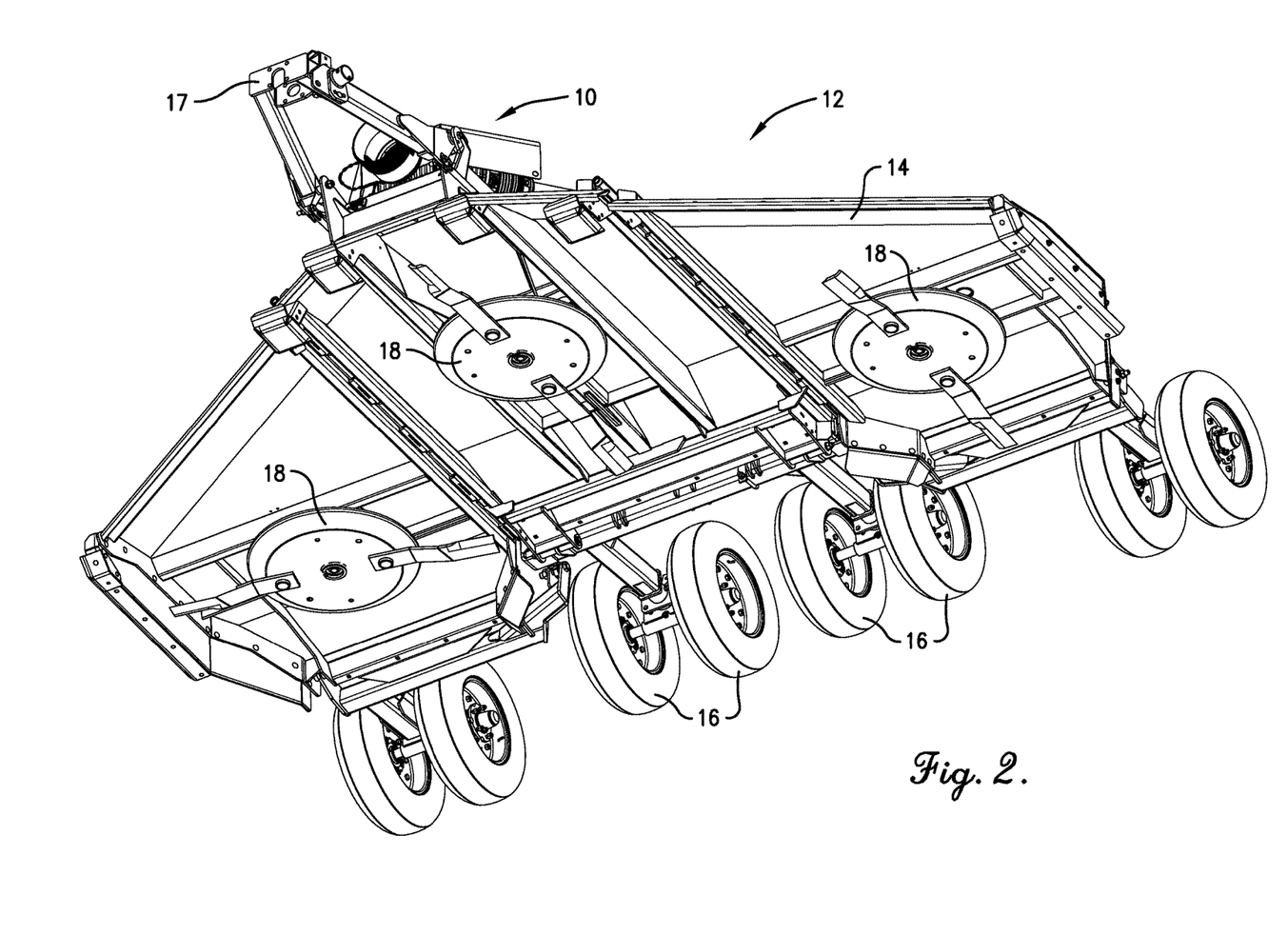
FIG. 2 is a front bottom perspective view of the rotary cutter from FIG. 1.

Embodiments of the present invention are directed to a shield assembly 10 for a rotary cutter 12, such as is illustrated in FIG. 1. Although the following description of the shield assembly 10 is with reference to the rotary cutter 12, it is understood that embodiments may provide for the shield assembly 10 to be used with other types of agricultural equipment. The rotary cutter 12 may broadly comprise a deck 14 with wheels 16 extending rearward from the deck 14. As such, and as discussed above, the rotary cutter 12 may be pulled behind a tractor (not shown), such as via a hitch mount assembly 17. In addition, the tractor may be configured to provide power to the rotary cutter 12, so as to cause rotation of blades 18 extending below the rotary cutter's 12 deck 14 (See, FIG. 2). To provide power to the rotary cutter 12, a main driveline (not shown) may extend from a power take-off of the tractor to the rotary cutter 12. The main driveline is configured to be connected to rotary-power distribution components of the rotary cutter 12, which are configured to distribute rotary power to the blades 18 of the rotary cutter 12. It should be understood that the term "rotary-power distribution components," as used herein, is defined to mean any one or more of the drivelines, splitterboxes, gearboxes, clutches, U-joints, or the like of the rotary cutter 12. Furthermore, as used herein, the terms "front" or "forward" means a direction towards the hitch mount assembly 17 (i.e., away from the wheels 16), whereas the terms "back," "rear," or "rearward" means a direction towards the wheels (i.e., away from the hitch mount assembly 17).

Figure 3:
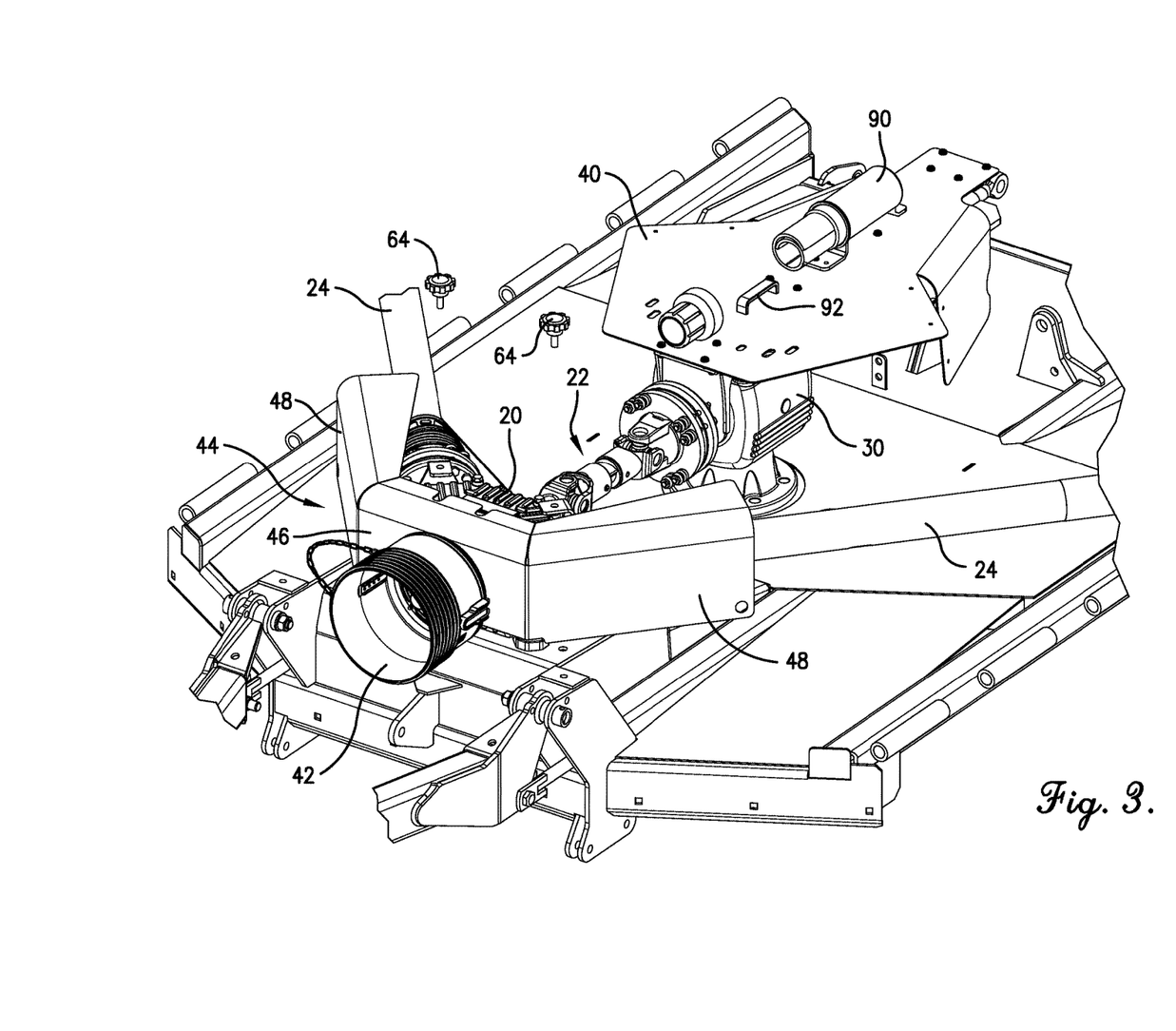
FIG. 3 is a front perspective partial view of the rotary cutter from FIG. 1, with the sliding shield assembly in an open configuration.
Figure 4:
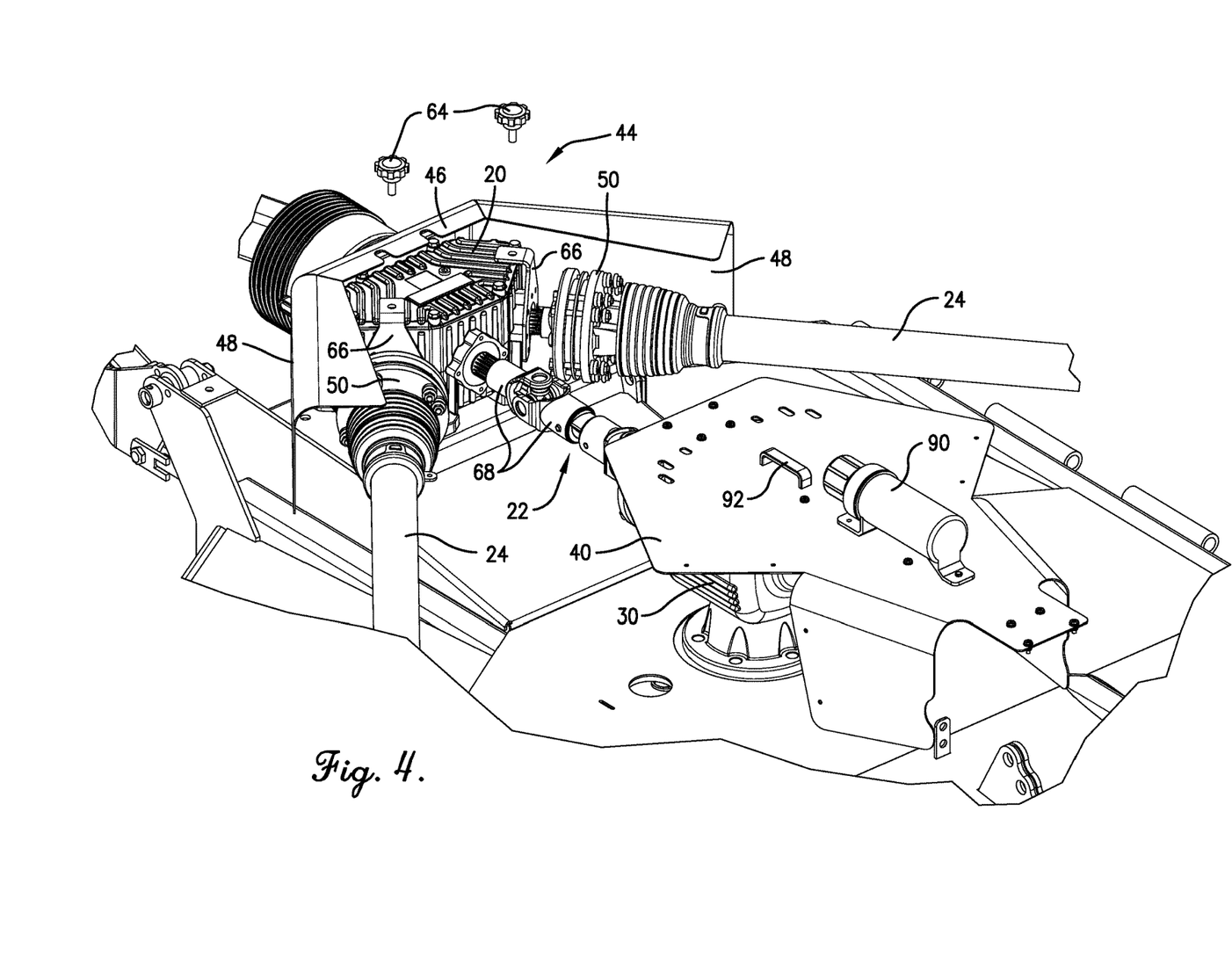
FIG. 4 is a rear perspective partial view of the rotary cutter from FIG. 1, with the sliding shield assembly in an open configuration.

In more detail, with reference to FIGS. 3 and 4, the main driveline may connect with a splitterbox 20, which is configured to split the rotary power from the main driveline to an intermediate driveline 22 and to two wing drivelines 24 also associated with the rotary cutter 12. The intermediate driveline 22 may be connected to a center gearbox 30, which is configured to transfer rotary power from the intermediate driveline 22 ninety degrees downward so as to provide power to a center cutter blade of the rotary cutter's 12 blades 18. The two wing drivelines 24 may each be connected to a wing gearbox 32 (See FIG. 1), configured to transfer rotary power from the wing driveline 24 ninety degrees downward so as to provide power to a wing cutter blade of the rotary cutter's 12 blades 18. In some embodiments, at least portions of the main driveline, the intermediate driveline 22, and the wing drivelines 24 may include a plastic sheath surrounding the drivelines, such that the drivelines are configured to rotate within the sheathes.

Figure 5:
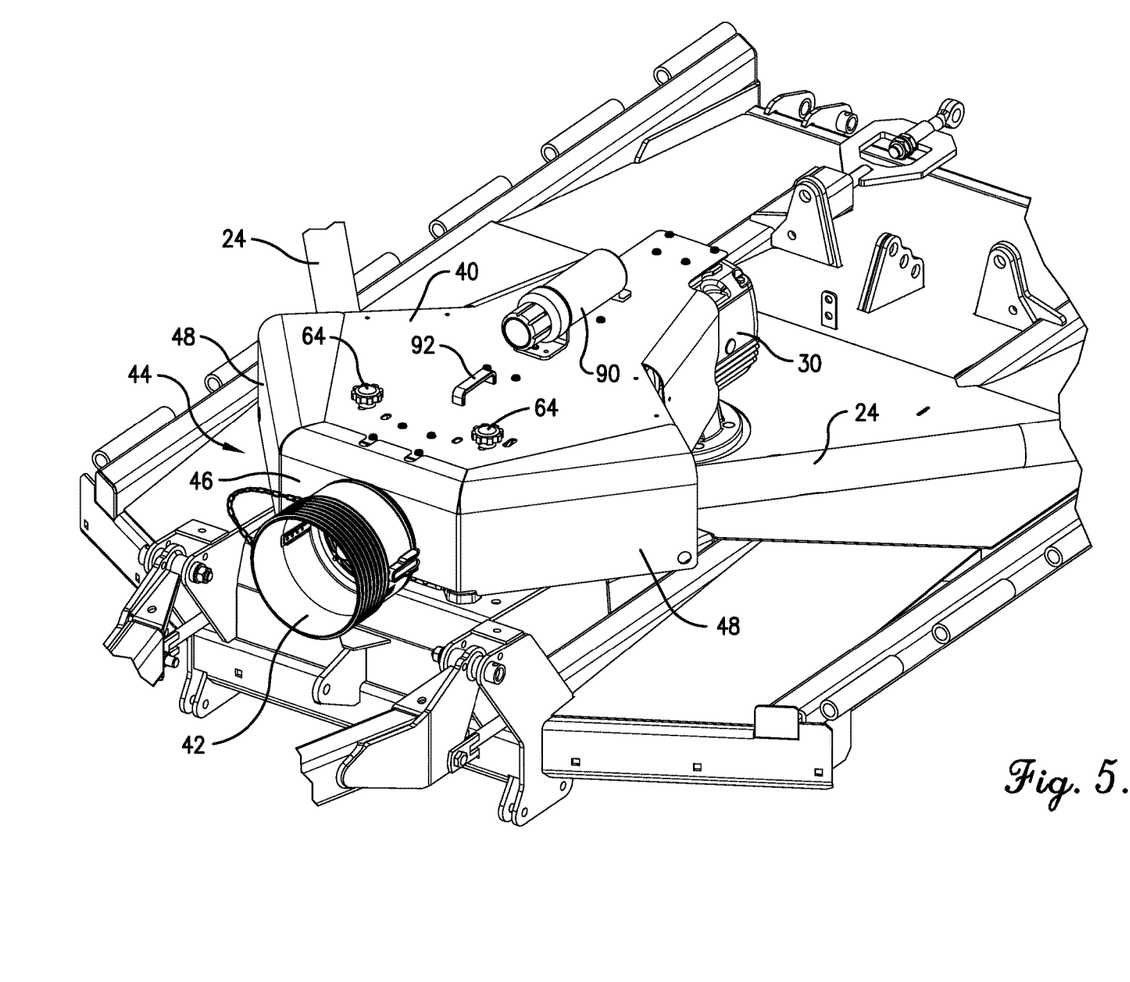
FIG. 5 is a front perspective partial view of the rotary cutter from FIG. 1, with the sliding shield assembly in a closed configuration.
Figure 6:
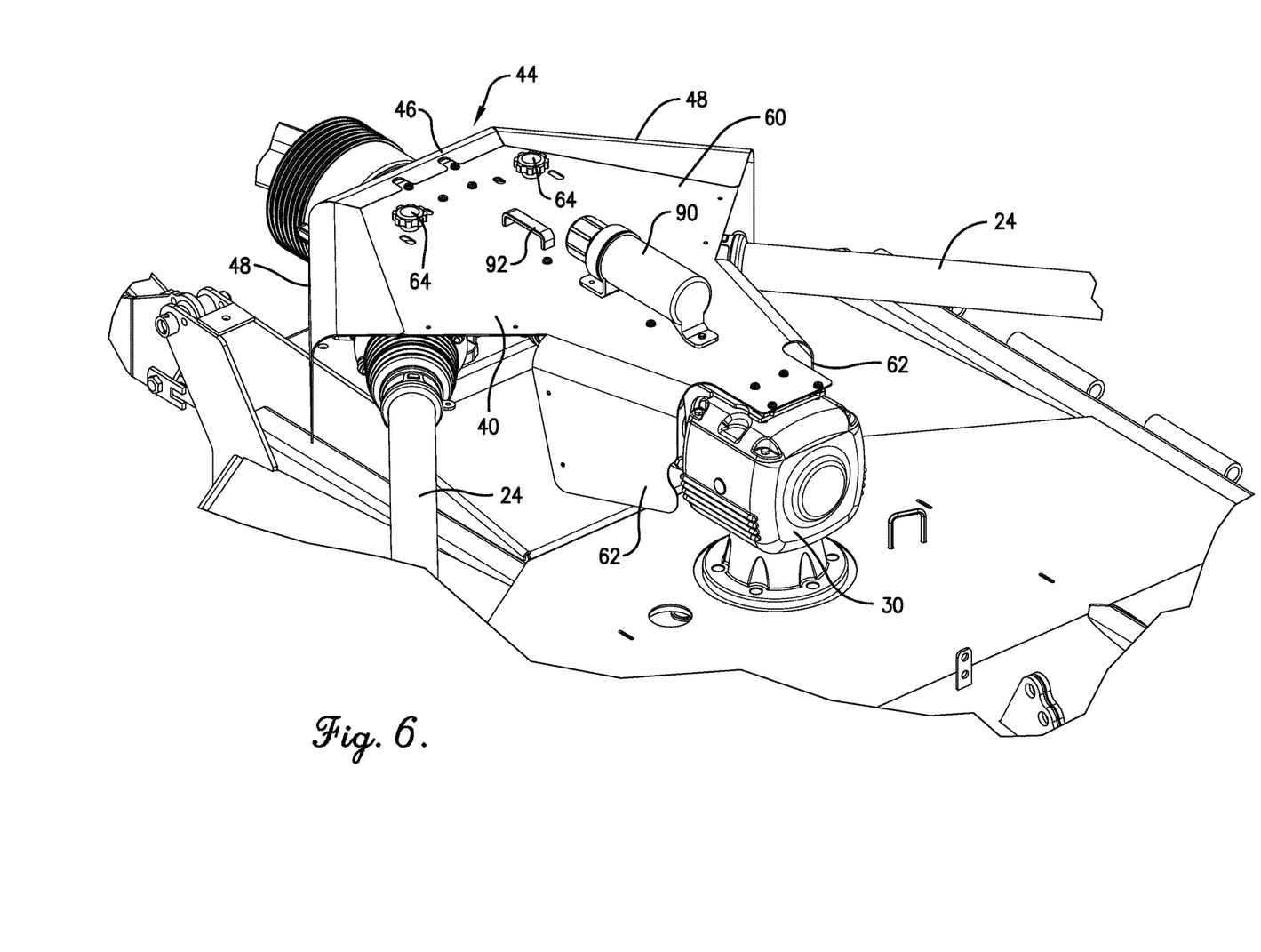
FIG. 6 is a rear perspective partial view of the rotary cutter from FIG. 1, with the sliding shield assembly in a closed configuration.

Turning now to the shield assembly 10 of embodiments of the present invention in more detail, the shield assembly 10 may comprise a sliding shield 40 that can be selectively positioned in either a closed position, as shown in FIGS. 5 and 6, or an open position, as shown in FIGS. 3 and 4. In the closed position, the sliding shield 40 is configured to cover certain components (e.g., the rotary-power distribution components) of the rotary cutter 12, as will be described in more detail below. Alternatively, in the open position, the sliding shield 40 is translated back from the closed position so as to provide access to the certain components of the rotary cutter 12, as will be discussed in more detail below.

In addition to the sliding shield 40, and with reference to FIGS. 3 and 5, the shield assembly 10 may comprise a counter cone 42 that is configured to cover and shield a portion of the main driveline that is used to provide power from the tractor to the splitterbox 20. The counter cone 42 may also cover shield a portion of the splitterbox 20. In more detail, the counter cone 42 may comprise a hollow cylinder, rectangular housing, or the like. The counter cone 42 may be comprised of a material having sufficient strength and durability to provide sufficient shielding to the main driveline and the splitterbox 20. For example, the counter cone 42 may be comprised of steel, carbon-fiber, polymers, composite materials, or the like. An interior diameter of the counter cone 42 may be sized so as to receive at least a portion of the main driveline, particularly a portion of the main driveline that connects with the splitter box 20. Embodiments may provide for the counter cone 42 to be securely fastened, such as by mechanical fasteners (e.g., latches, clasps, nut and bolt combinations, etc.), welding, or the like, to a front portion of the splitterbox 20. As such, the counter cone 42 can be rigidly mounted to the splitterbox 20, so as to surround, cover, and shield the main driveline's connection with the splitterbox 20, thereby shielding a portion of the main driveline and a portion of the splitterbox 20 (e.g., a front portion of the splitterbox 20).

In addition, as illustrated in FIGS. 3-6, certain embodiments of the present invention provide for the shield assembly 10 to include a fixed shield 44 that is configured to cover and shield a front portion of the splitterbox 20, at least some side portions of the wing drivelines 24, and/or connections between the splitterbox 20 and the wing drivelines 24. In more detail, the fixed shield 44 may be comprised of a material having sufficient strength and durability to provide sufficient shielding to the splitterbox 20 and the wing drivelines 24. For example, the fixed shield 44 may be comprised of steel, carbon-fiber, polymers, composite materials, or the like. The fixed shield 44 may comprise a center section 46 that is configured to cover a front portion of the splitterbox 20. The fixed shield 44 may additionally comprise a pair of side sections 48 that each extend from a side of the center section 46 and that are configured to cover portions of the wing drivelines 24 and/or connections between the splitterbox 20 and the wing drivelines 24.

The center section 46 and the side sections 48 may comprise generally vertically-extending planar elements, which are, respectively, configured to shield front portions of the splitterbox 20 and side portions of the wing drivelines 24. In addition, however, each of the center section 46 and the side sections 48 may include an overhang element that extends generally horizontally from an upper portion of the planar elements. As such, the center section 46 and the side sections 48 may, respectively, be configured to shield at least portion of the tops of the splitterbox 20 and the wing drivelines 24. In addition, the side sections 48 may be configured to shield connections between the splitterbox 20 and the wing drivelines 24, which may include slip clutches 50 (See FIG. 4) or other types of components for connecting rotating elements. In some embodiments, the slip clutches 50 form part of the wing drivelines 24. Embodiments may provide for the fixed shield 44 to be securely fastened, such as by mechanical fasteners (e.g., latches, clasps, nut and bolt combinations, etc.), welding, or the like, to the splitterbox 20, such that the fixed shield 44 can be rigidly mounted to the splitterbox 20, so as to thereby cover and shield at least a portion of the splitterbox 20, at least a portion of the wing drivelines 24, and/or connections between the splitterbox 20 and the wing drivelines 24.

Figure 7:
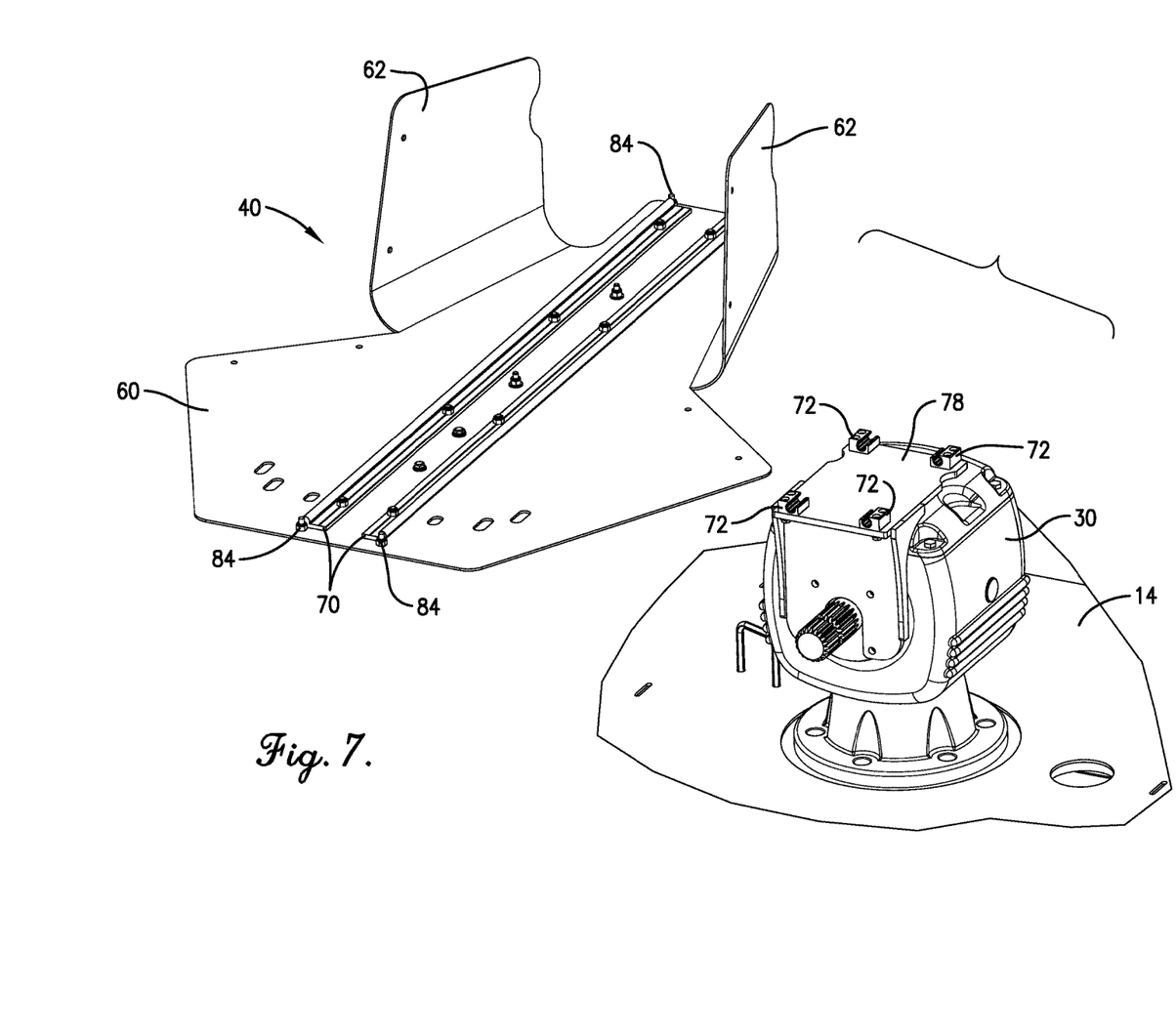
FIG. 7 is a partial exploded view of a linear translation assembly of the sliding shield assembly from FIG. 1, with the linear translation assembly including slide rails positioned on a bottom surface of a sliding shield and a plurality of bearing blocks secured to the rotary cutter via a bearing block bracket.

Turning back to the sliding shield 40 in more detail, and as perhaps best illustrated by FIG. 7, the sliding shield 40 may include a generally planar main plate 60 configured to be positioned generally horizontally and a pair of side plates 62 that extend vertically downward from the main plate 60 near a rear portion of the main plate 60. The sliding shield 40 may be comprised of a material having sufficient strength and durability to provide sufficient shielding to the splitterbox 20, the intermediate drivelines 22, the wing drivelines 24, and the center gearbox 30, as shown in FIGS. 5 and 6 with the sliding shield 40 in the closed position. For example, the sliding shield 40 may be comprised of steel, carbon-fiber, polymers, composite materials, or the like.

With the sliding shield 40 in the closed position (i.e., FIGS. 5 and 6), a forward edge of the sliding shield 40 may be positioned adjacent to the fixed shield 44. In some embodiments, the forward edge of the sliding shield 40 may be positioned under the overhang elements of the fixed shield 44, such that the fixed shield 44 at least partially overlaps the sliding shield 40. The sliding shield 40 can be secured in the closed position via threaded hand-knobs 64 that engage with threaded openings formed on brackets 66 that are secured to the splitterbox 20, as shown in FIG. 4. In such a closed position, the sliding shield 40 is generally positioned above portions of the splitterbox 20, the intermediate drivelines 22, the wing drivelines 24, and the center gearbox 30. As such, the main plate 60 of the sliding shield 40 is configured to cover and shield top portions of the splitterbox 20, the intermediate driveline 22, the wing drivelines 24, and the center gearbox 30. In addition, the side plates 62 are configured to cover and shield portions of the sides of the center gearbox 30 and intermediate driveline 22 and/or a connection between the center gearbox 30 and intermediate driveline 22.

From the closed position, the sliding shield 40 is configured to be translated to an open position, as shown in FIGS. 3 and 4. Specifically, the sliding shield 40 can be shifted linearly away from the splitterbox 20 towards a rear of the rotary cutter 12. In such an open position, access can be provided to the splitterbox 20 and to portions of the intermediate driveline 22 and the wing drivelines 24. Furthermore, as perhaps best shown in FIG. 4, the intermediate driveline 22 and the wing drivelines 24 may each include one or more slip clutches 50 and/or U-joints 68 which may be used to interconnect the intermediate driveline 22 and the wing drivelines 24 with the splitterbox 20. With the sliding shield 40 in the open position, the splitterbox 20, the intermediate driveline 22, the wing drivelines 24, and any slip clutches 50 and/or U-joints 68 are accessible for maintenance and/or repair. Beneficially, because the sliding shield 40 translates, in a generally linear manner, rearward, access to the splitterbox 20, the intermediate driveline 22, the wing drivelines 24, and any slip clutches 50 and/or U-joints 68 can be made available from generally any side of the rotary cutter 12 (e.g., front side, left side, and right side).

To accomplish the shifting of the sliding shield 40 from the closed position to the open position, the hand-knobs 64 should be loosened from brackets 66, such that the sliding shield 40 can be translated rearward. To facilitate such translation, the shield assembly 10 may comprise, as shown in FIG. 7, a linear translation assembly that includes one or more slide rails 70 configured to linearly actuate within one or more bearing blocks 72. In more detail, a bottom surface of the sliding shield 40 may include two spaced apart, generally parallel slide rails 70. The slide rails 70 may be formed from anodized aluminum or other material of sufficient strength and durability and may have a length that is generally equal to or slightly less than a length of the sliding shield 40. In some embodiments, the slide rails may have a generally consistent cross-section along their entire lengths. As perhaps best shown in FIG. 8, the slide rails 70 may include a base section 74 by which the slide rails 70 are secured to the sliding shield 40, such as by fasteners (e.g., nut and bolt combinations), welding or the like. The slide rails 70 may additionally include an extended knob section 76 that extends from the base section 74. The knob section 76 may be sized for receipt in the bearing blocks 72, as discussed in more detail below, so as to facilitate translation within the bearing blocks 72.

The linear translation assembly may further include a plurality of bearing blocks 72 through which the slide rails 70 can translate. As shown in FIG. 7, the bearing blocks 72 may be secured to a bearing block bracket 78 (e.g., via fasteners, welding, or the like), which is itself attached to the center gearbox 30 via fasteners, welding, or the like. In the embodiments shown in the drawings, the linear translation assembly may include four bearing blocks 72 comprising two pairs of aligned (i.e., aligned in the direction of the sliding shield's translation) bearing blocks 72. As such, the bearing blocks 72 are configured such that each of the slide rails 70 can linearly actuate through a pair of the aligned bearing blocks 72.

Figures 8, 9:
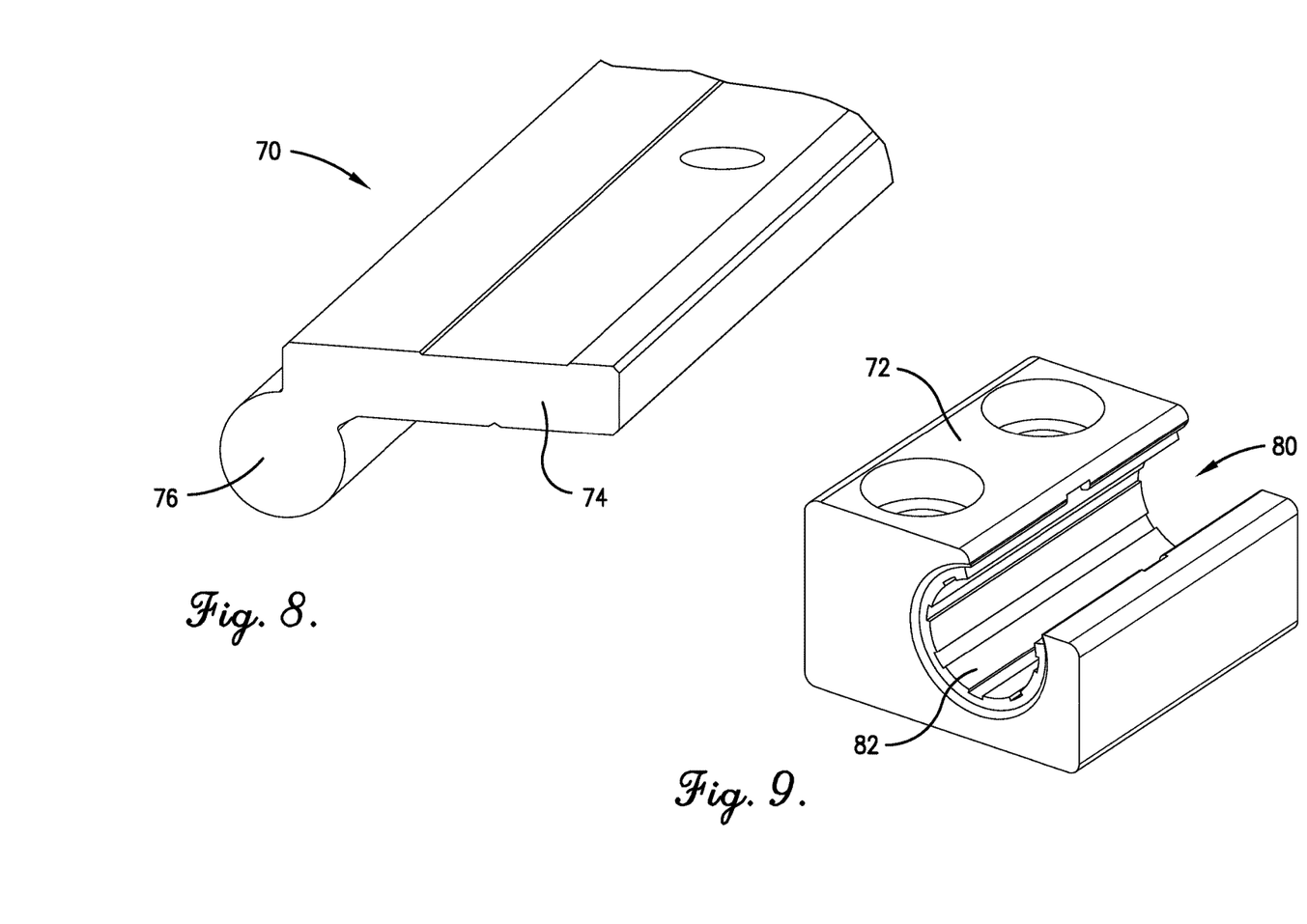
FIG. 8 is a partial view of a slide rail from FIG. 7.
FIG. 9 is a perspective view of a bearing block from FIG. 7.

To facilitate the translation of the slide rails 70 through the bearing blocks 72, as perhaps best shown in FIG. 9, the bearing blocks 72 may each include a concave section 80 that is configured to receive the knob section 76 of the slide rails 70. Specifically, the inner diameter of the concave section 80 of the bearing blocks 72 may correspond to a diameter of the knob section 76 of the slide rails 70. As such, the bearing blocks 72 are configured to at least partially surround the knob section 76 of the slide rails 70, such that the bearing blocks 72 permit the slide rails 70 to linearly actuate within the bearing blocks 72 but restrict the slide rails 70 from being laterally shifted away from (and/or separated from) the bearing blocks 72. In some embodiments, the bearing blocks 72 may be formed from zinc. In addition, the bearing blocks 72 may each include a replaceable liner piece 82 positioned within and forming part of the concave section 80 of the bearing blocks 72. As such, the liner pieces 82 is configured to make contact with the knob sections 76 of the slide rails 70 during translation. In some embodiments, the liner pieces 82 may be formed from plastic, such that the liner pieces 82 are configured to reduce friction as the slide rails 70 actuate therethrough.

Furthermore, as shown in FIG. 7, the sliding shield 40 may include one or more stop mechanisms 84, such as stop bolts that restrict the sliding shield 40 from actuating too far, which may cause the slide rails 70 to actuate out of engagement with the bearing blocks 72. In some embodiments, the stop mechanisms 84 may comprise stop bolts that extend from the bottom surface of the sliding shield 40. The stop bolts may be positioned near the ends of the slide rails 70 so as to restrict the slide rails 70 from linearly actuating out of engagement with the bearing blocks 72 (i.e., beyond maximum open/closed positions).

In some embodiments, as shown in FIGS. 3-6, the sliding shield 40 may also include a user's guide container 90 secured to a top surface of the sliding shield 40. The container 90 may be configured to hold a user's guide or other documentation that can be accessed by a user of the rotary cutter 12 for reference during use of the rotary cutter 12. Specifically, the container 90 may have a threaded cap, which is removable for providing access to the interior of the container 90. Nevertheless, the container 90 may have a generally-tubular shape and may be sealed from the elements, so as to prevent moisture or other atmospheric elements from entering the container 90 and ruining the user's guide.

Figure 10:
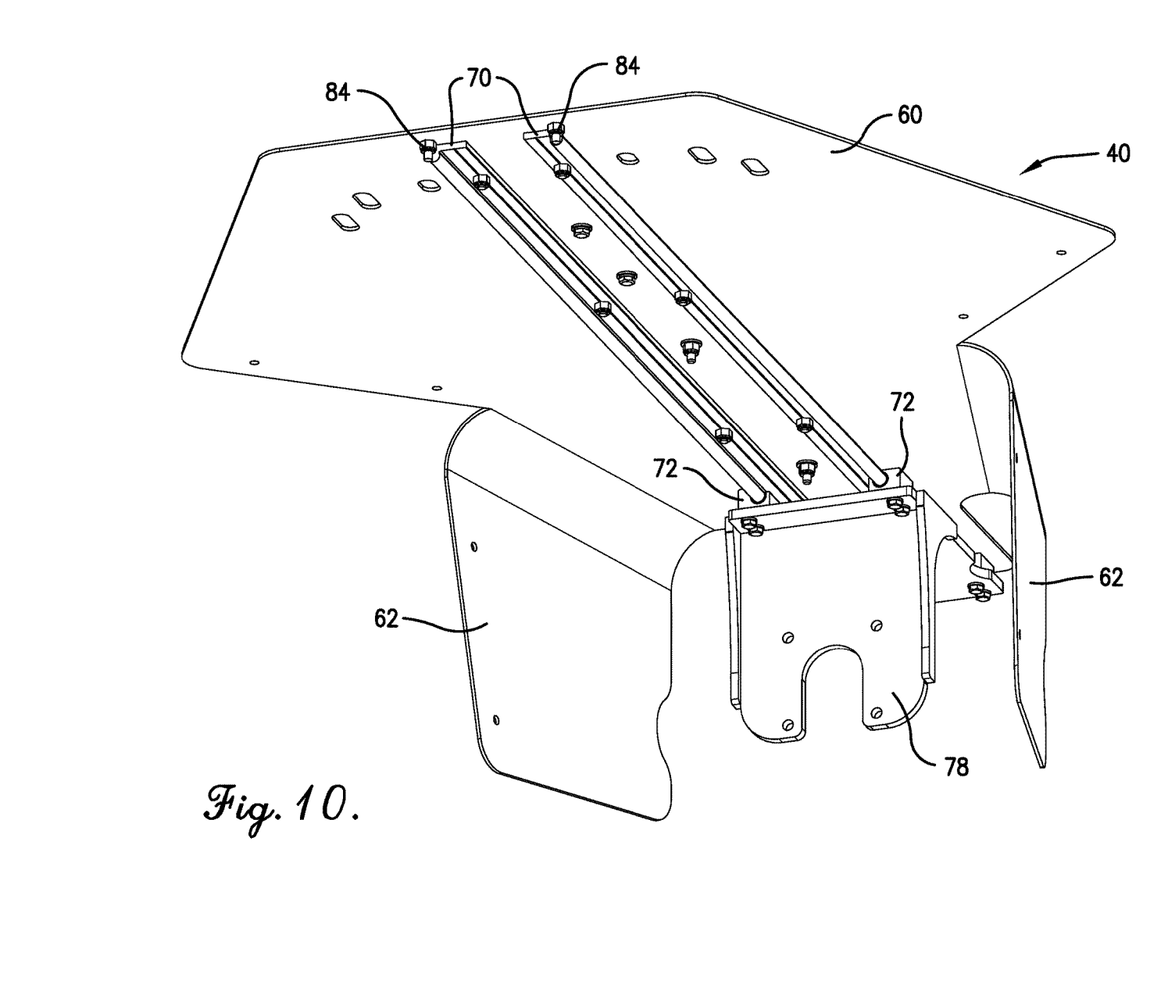
FIG. 10 is perspective view of the sliding shield from FIG. 7 integrated with the bearing block bracket via the slide rails and the bearing blocks.
Figure 11:
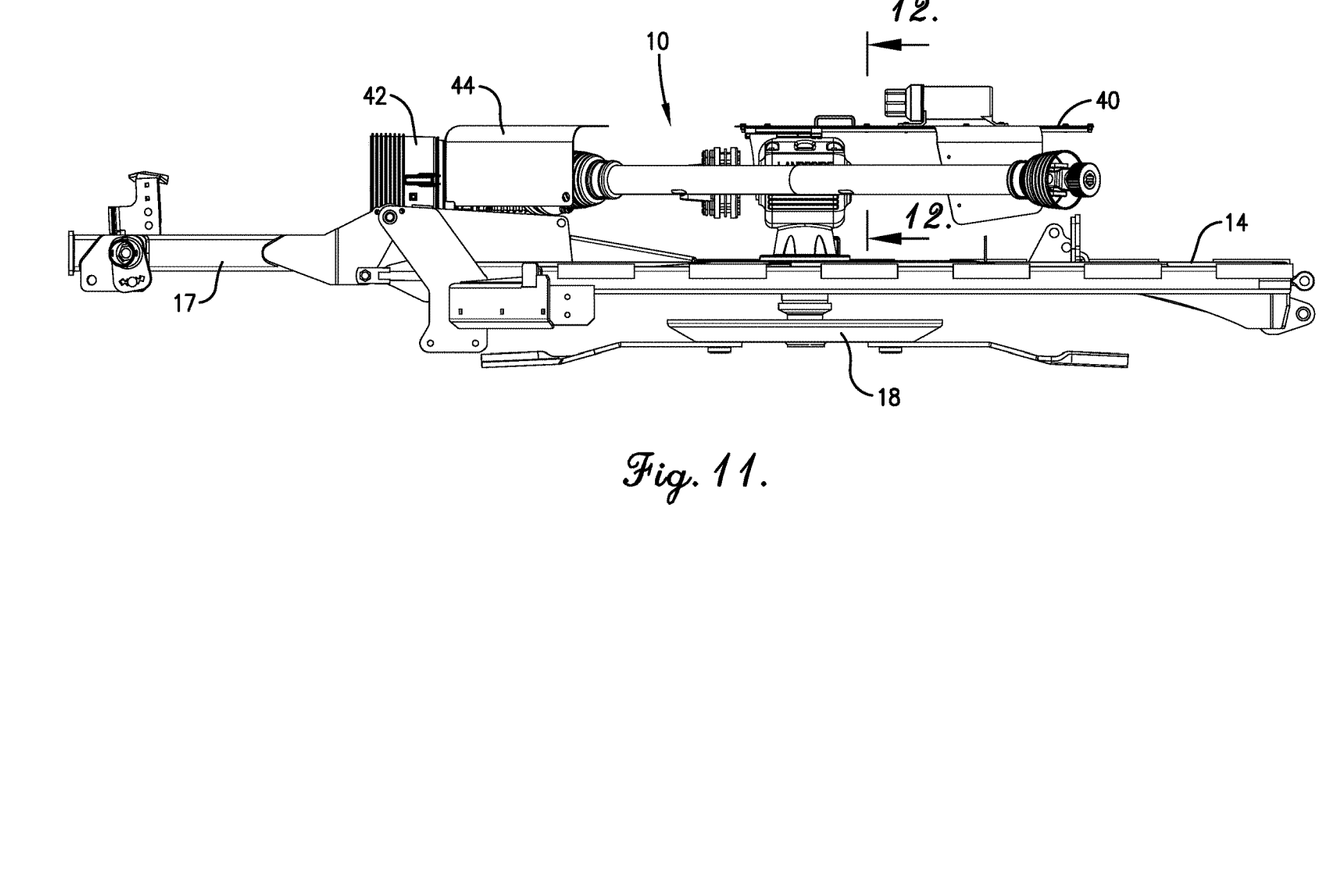
FIG. 11 is a side elevation view of the rotary cutter from FIG. 1, with the slide shield assembly in an open position.
Figure 12:
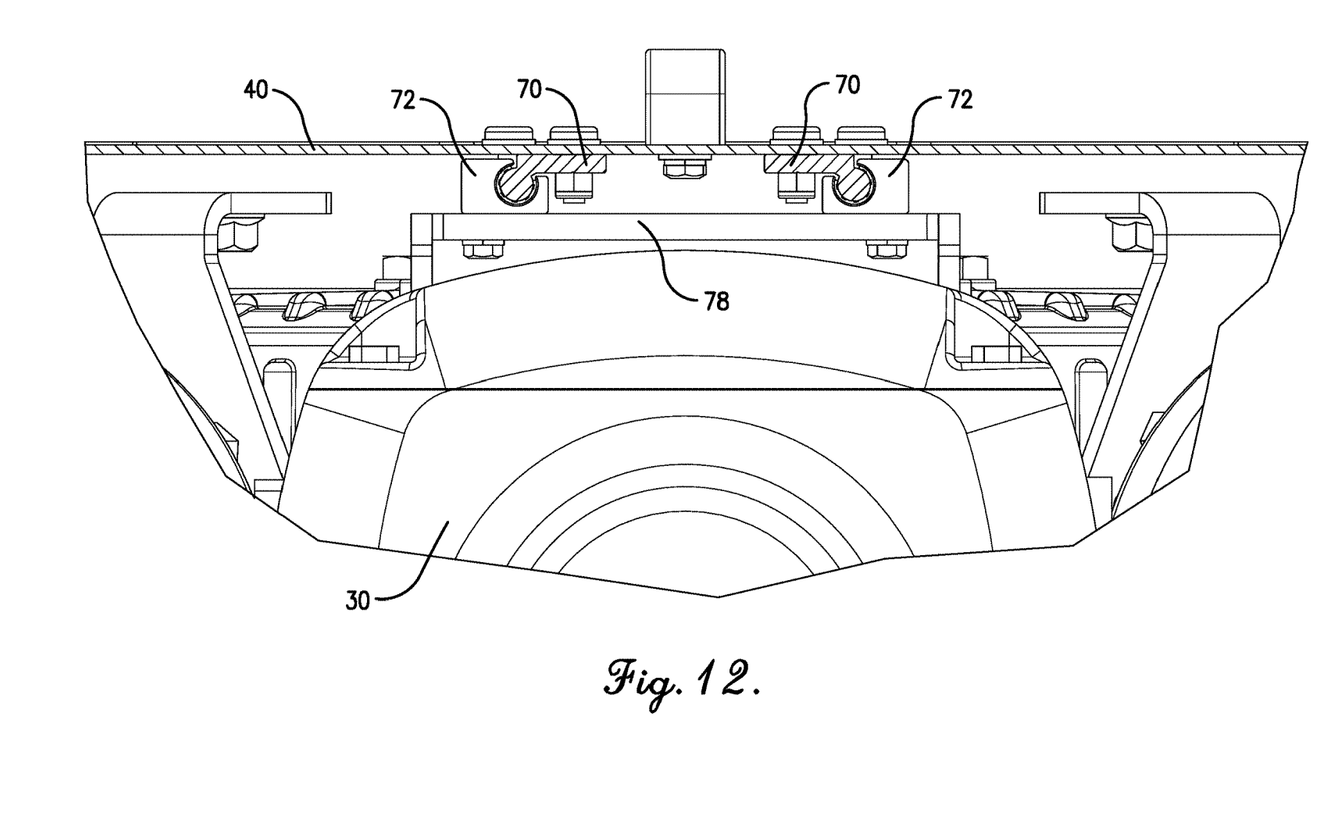
FIG. 12 is a cross-section view taken along the lines 12-12 from FIG. 11.

In operation, the sliding shield 40 can be shifted from the closed position (i.e., FIGS. 5 and 6) to the open position (i.e., FIGS. 3 and 4) by initially loosening the hand-knobs 64 so as to disengage the hand-knobs 64 from their respective openings. As such, the sliding shield 40 is free to actuate rearward. In particular, a user can grasp a handle 92 rigidly secured to a top surface of the sliding shield so as to force the sliding shield 40 to translate rearward to the open position. As described above, the sliding shield 40 is configured to shift rearward via the slide rails 70 actuating through the bearing blocks 72, as illustrated in FIGS. 10-12. Because the bearing blocks 72 are rigidly secured to the rotary cutter 12, via the bearing block bracket 78 and center gearbox 30, such shifting of the sliding shield 40 will generally comprise linear actuation, such that the sliding shield 40 will remain orientated within a given plane while in the closed position, while in the open position, and during shifting therebetween. In some embodiments, the given plane may be generally parallel with a plane of the rotary cutter's 12 deck 14.

The sliding shield 40 can be shifted rearward to an open position as far as necessary to provide access to the rotary-power distribution components of the rotary cutter (e.g., splitterbox 20, slip clutches 50, U-joints 68, etc.) for repair, maintenance, and the like. Nevertheless, as mentioned above, the stop mechanism 84 (e.g., the stop bolts) may restrict the sliding shield 40 from being shifted rearward too far, so as to prevent the slide rails 70 from disengaging from the bearing blocks 72. A reverse operation can be performed so as to shift the sliding shield 40 back from the open position to the closed position once the required repair or maintenance has been performed. To secure the sliding shield 40 in the closed position, the hand-knobs 64 should be re-secured through the sliding shield 40 and into engagement with the brackets 66. Beneficially, the hand-knobs 64 and the linear translation assembly (e.g., slide rails 70 and bearing blocks 72) maintain the sliding shield securely in the closed position, so as to prevent vibration, rattling, and excessive noise during operation of the rotary cutter 12. With the sliding shield 40 in the closed position, the shield assembly 10 and the sheathes around the drivelines may be configured to cover at least 50 percent, at least 75 percent, at least 85 percent, at least 95 percent, or more of the rotating parts of the main driveline, the splitterbox, the intermediate driveline, and the wing drivelines.

Although the invention has been described with reference to the embodiment illustrated in the attached drawing figures, it is noted that equivalents may be employed and substitutions made herein without departing from the scope of the invention as recited in the claims.

The invention claimed is:

1. A rotary cutter comprising:
   a deck;
   a splitterbox configured to receive power from a main driveline and to distribute the power to one or more gearboxes;
   a center gearbox configured to actuate a center cutter blade, wherein the center gearbox is connected to said splitterbox via an intermediate driveline;

first and second wing gearboxes configured to actuate first and second wing cutter blades, respectively, wherein said first and second wing gearboxes are connected to said splitterbox via first and second wing drivelines, respectively; and a shield configured to be selectively positioned in a closed position and an open position, wherein in the closed position said shield is configured to cover at least a portion of said splitterbox, said intermediate driveline, and said first and second wing drivelines, wherein said shield is configured to shift from the closed position to the open position via substantially linear actuation along a plane that is generally parallel with the deck of the rotary cutter.

2. The rotary cutter of claim 1, wherein said shield comprises a generally planar main plate, with such main plate being configured to cover the portion of said splitterbox, said intermediate driveline, and said first and second wing drivelines when said shield is in the closed position.

3. The rotary cutter of claim 2, wherein said shield further comprises a pair of side plates extending downward from said main plate, with such side plates being configured to cover side portions of said center gearbox or of said intermediate driveline.

4. The rotary cutter of claim 1, wherein said shield is configured to shift by way of a linear translation assembly comprising one or more slide rails positioned on a bottom surface of said shield and one or more bearing blocks positioned on said rotary cuter and configured to receive said slide rails.

5. The rotary cutter of claim 1, wherein said shield includes a handle on a top surface of said shield, wherein said handle is configured to assist a user in shifting said shield between closed and open positions.

6. The rotary cutter of claim 1, wherein said shield includes a container on a top surface of said shield, wherein said container is configured to secure documents to said rotary cutter and to protect the documents from atmospheric elements.

7. A method for accessing rotary-power distribution components of a rotary cutter, wherein the rotary-power distribution components include a splitterbox, one or more gearboxes, and one or more drivelines connecting the gearboxes with the splitterbox, wherein said method comprises the steps of:

(a) un-securing a sliding shield from a closed position, wherein in the closed position the sliding shield is configured to cover at least a portion of the splitterbox and at least a portion of the drivelines; and (b) shifting the sliding shield from the closed position to an open position, wherein in the open position the sliding shield is configured to provide access to the splitterbox and to the drivelines, wherein said shifting of step (b) comprises shifting the sliding shield from the closed position to the open position via generally linear actuation along a plane that is generally parallel with a deck of the rotary cutter.

* * * * *